(12) United States Patent
Walter et al.

(10) Patent No.: US 8,642,709 B2
(45) Date of Patent: Feb. 4, 2014

(54) EPOXY RESIN COMPOSITION WITH REDUCED TOXICITY

(71) Applicants: Henkel Corporation, Rocky Hill, CT (US); Henkel AG & Co. KGaA, Duesseldorf (DE)

(72) Inventors: Pablo Walter, Duesseldorf (DE); Mustapha Benomar, Duisburg (DE); Stefen Kreiling, Eppelheim (DE); Angelika Troll, Duesseldorf (DE); Rainer Schoenfeld, Duesseldorf (DE); Timothy Walsh, Weymouth, MA (US)

(73) Assignees: Henkel AG & Co. KGaA, Duessledorf (DE); Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/624,108

(22) Filed: Sep. 21, 2012

(65) Prior Publication Data

US 2013/0023603 A1  Jan. 24, 2013

Related U.S. Application Data

(63) Continuation of application No. PCT/EP2011/117229, filed on Mar. 22, 2011.

(60) Provisional application No. 61/316,476, filed on Mar. 23, 2010.

(51) Int. Cl.

| C08G 8/28 | (2006.01) |
|---|---|
| C08L 61/00 | (2006.01) |
| C08L 61/06 | (2006.01) |
| C08G 59/50 | (2006.01) |
| C08L 63/00 | (2006.01) |
| C08G 59/38 | (2006.01) |
| C08G 59/22 | (2006.01) |
| C08G 65/48 | (2006.01) |
| C08G 59/14 | (2006.01) |

(52) U.S. Cl.
USPC ........... 525/505; 523/400; 523/427; 523/428; 525/390; 525/396; 525/480; 525/481; 525/504; 525/507; 525/523; 525/524; 525/534

(58) Field of Classification Search
USPC .......................................................... 528/87
See application file for complete search history.

(56) References Cited

U.S. PATENT DOCUMENTS

| 3,294,748 A | 12/1966 | Rogers et al. |
|---|---|---|
| 3,630,997 A | 12/1971 | Craven |
| 3,945,996 A | 3/1976 | Conrad et al. |
| 4,410,457 A | 10/1983 | Fujimura et al. |
| 4,990,679 A | 2/1991 | Wolf et al. |
| 5,420,952 A | 5/1995 | Katsura et al. |
| 6,060,539 A | 5/2000 | Hermansen et al. |
| 6,207,733 B1 | 3/2001 | Feola et al. |
| 6,348,513 B1 | 2/2002 | Hilborn et al. |
| 2005/0249891 A1* | 11/2005 | Kitamura et al. ............ 428/1.53 |
| 2007/0123664 A1 | 5/2007 | Abrami et al. |

FOREIGN PATENT DOCUMENTS

| DE | 19729875 A1 | 1/1998 |
|---|---|---|
| EP | 2006310 A2 | 12/2008 |
| JP | 2204506 | 8/1990 |
| WO | 9929757 A1 | 6/1999 |
| WO | 2005028542 | 3/2005 |
| WO | 2007060091 A1 | 5/2007 |

OTHER PUBLICATIONS

International Search Report issues in connection with International Patent Application No. PCT/EP2011/054332 mailed on Nov. 2, 2011.

* cited by examiner

Primary Examiner — Peter F Godenschwager
Assistant Examiner — David Karst
(74) Attorney, Agent, or Firm — Sun Hee Lehmann

(57) ABSTRACT

The subject matter of the present Application is two-component compositions whose first component is a mixture of reactive epoxy resins and optionally further formulation constituents which contains, based on the mass of all epoxy resins,
a) at least 10 wt % of an epoxy group-containing reaction product of epichlorohydrin with polypropylene glycol which has an epoxy equivalent weight of at least 250 g/eq, and
b) at least 10 wt % of an epoxy group-containing reaction product of epichlorohydrin with a novolac resin which has an epoxy equivalent weight of at least 175 g/eq,
and whose second component contains at least one thiol group-containing hardener for epoxy resins.

10 Claims, No Drawings

EPOXY RESIN COMPOSITION WITH REDUCED TOXICITY

The present invention relates to a two-component adhesive based on a specific epoxy resin system. The epoxy resin system according to the present invention makes it possible to provide, without the use of components that are categorized as toxic, irritating, or sensitizing and that would require corresponding labeling under European law, adhesives that are equivalent in quality to conventional adhesives in terms of utilization properties.

Epoxy-based resin systems have been successfully used for some time as adhesives or repair compounds for consumers, hobbyists, and craftsmen, and in the aviation, automotive, or electrical industry, as adhesives or sealants or for the coating of surfaces, or as resin systems with a number of different materials for the manufacture of composite materials. Hardenable formulations that contain epoxy/hardener mixtures are suitable in particular as structural adhesives. One important property of the unhardened resin system is its viscosity, which is significant in terms of handling and processability. Important material properties of the hardened formulations are, among others, adhesive power (often determined as tensile shear strength) and modulus of elasticity.

Reactive epoxy resin systems of the existing art often contain constituents that have been categorized as toxic, irritating, sensitizing, and/or hazardous to water resources, and can result, for example, in contact dermatitis during processing. According to European law, such preparations must be provided with the corresponding hazard label (e.g. C, Xn, Xi, N). For reasons of environmental protection, safety, and industrial hygiene, there is a desire for reactive epoxy resin-containing preparations that do not require labeling under European law and that exhibit a reduced sensitizing potential, but that meet technical requirements with regard to processability and adhesive properties.

It is known that reactive epoxy resins having a molar weight above 700 g/mol are not sensitizing and are not subject to labeling requirements. Examples thereof are high-molecular-weight solids based on DGEBA (diglycidyl ethers of bisphenol A), and liquid epoxy-terminated polyethers with a high epoxy equivalent weight. These do not, however exhibit the viscosity properties necessary for processing prior to curing, and/or the necessary strength properties after curing. High-molecular-weight solid epoxy novolacs have the high epoxy functionality necessary for high strength (and, correspondingly, a low epoxy equivalent weight), but are not processable because of their high viscosity at room temperature.

An object of the present invention was therefore to develop a hardenable epoxy resin that is advantageous in toxicological and dermatological terms and nevertheless has no disadvantages in the context of utilization properties, in particular viscosity during processing and/or strength after curing.

It has now been found, surprisingly, that suitable mixtures of different reactive epoxy resins result in the desired property combination of freedom from labeling requirements, processability, and adhesive properties.

A first subject of the present invention is therefore a two-component composition whose first component is a mixture of reactive epoxy resins and optionally further formulation constituents which contains, based on the mass of all epoxy resins, a) at least 10 wt % of an epoxy group-containing reaction product of epichlorohydrin with polypropylene glycol which has an epoxy equivalent weight of at least 250 g/eq, and b) at least 10 wt % of an epoxy group-containing reaction product of epichlorohydrin with a novolac resin which has an epoxy equivalent weight of at least 175 g/eq, and whose second component contains at least one thiol group-containing hardener for epoxy resins.

According to the present invention, a "reactive epoxy resin" is understood as a prepolymer that has an average epoxy functionality greater than 1. Because of the reactive epoxy groups, the prepolymer can be reacted with further molecules (called "hardeners") that are reactive with respect to epoxy groups, and thereby be "cured" or "hardened."

The composition according to the present invention contains, as a first component a) essential to the invention, at least 10 wt % of an epoxy group-containing reaction product of epichlorohydrin with polypropylene glycol which has an epoxy equivalent weight of at least 250 g/eq.

In a preferred embodiment, the composition according to the present invention contains 10 to 60 wt % of component a). A quantity range from 30 to 45 wt % is especially preferred. The quantity indications refer in each case to the mixture of all epoxy resins, without the further formulation constituents.

In the context of the work on which this invention is based, it was possible to show that epoxy group-containing reaction products of epichlorohydrin with polypropylene glycol having an epoxy equivalent weight of at least 300 g/eq exhibit particularly advantageous properties.

Particularly preferred components a) are, according to the present invention, the reactive epoxy resins marketed by the Dow company under the commercial designations DER 732 (EEW 310 to 330 g/eq) and DER 732P (EEW 310 to 330 g/eq).

It is particularly advantageous according to the present invention if corresponding epoxy group-containing reaction products of epichlorohydrin with polypropylene glycol having an epoxy equivalent weight of less than 300 g/eq are contained in the compositions at a proportion of at most 3 wt %, in particular at most 1 wt %, based in each case on the first component made up of a mixture of reactive epoxy resins and optionally further formulation constituents.

As a second component b) essential to the invention, the composition according to the present invention contains at least 10 wt % of an epoxy group-containing reaction product of epichlorohydrin with a novolac resin which has an epoxy equivalent weight of at least 175 g/eq.

In a preferred embodiment, the composition according to the present invention contains 10 to 85 wt % of component b). A quantity range from 30 to 45 wt % is especially preferred. The quantity indications refer in each case to the mixture of all epoxy resins, without the further formulation constituents.

In the context of the work on which this invention is based, it was possible to show that epoxy group-containing reaction products of epichlorohydrin with a novolac having an epoxy equivalent weight of at least 180 g/eq, and in particular of at least 190 g/eq, exhibit particularly advantageous properties.

Novolacs preferred according to the present invention are the polycondensation products of formaldehyde with phenol and/or cresol.

It has furthermore proven to be advantageous if the reaction products of epichlorohydrin and novolac have an epoxy functionality of at least 3, in particular of at least 3.5.

Reaction products of epichlorohydrin and novolac which have an epoxy equivalent weight of at least 175 g/eq and simultaneously an epoxy functionality of at least 3 were found to be particularly convincing in terms of the objects stated according to the present invention. Reaction products of epichlorohydrin and novolac having an epoxy equivalent weight of at least 180 g/eq and an epoxy functionality of at least 3, in particular reaction products of epichlorohydrin and novolac having an epoxy equivalent weight of at least 190 g/eq and an epoxy functionality of at least 3.5, are particularly preferred.

The desired property combination of processability prior to curing, and adhesion strength after curing, are most effectively achieved thereby.

Particularly preferred components b) are, according to the present invention, the reactive epoxy resins marketed under the commercial designations DEN 439 (EEW 191 to 210 g/eq, functionality 3.8; Dow), Araldite ECN 1299 (cresol-formaldehyde novolac, EEW 235 g/eq, functionality 2.5 to 5.5; Huntsman), Epikote 154 (EEW 176 to 181 g/eq; Hexion). DEN 439 is very particularly preferred according to the present invention.

It is particularly advantageous according to the present invention if corresponding reaction products of epichlorohydrin with novolac having an epoxy equivalent weight of less than 175 g/eq are contained at a proportion of at most 3 wt %, in particular at most 1 wt %, based in each case on the first component made up of the mixture of reactive epoxy resins and optionally further formulation constituents.

In order to ensure optimum processability of the compositions according to the present invention, it has proven particularly advantageous according to the present invention if the epoxy-containing compositions have viscosities below 3000 Pas. Epoxy-containing preparations having a viscosity below 500 PaS are very particularly preferred. Viscosity measurements are accomplished according to the present invention at 25° C. using a rheometer and the following viscosity-dependent settings:

at a viscosity <0.25 Pa*s, measurement was performed using a cone and plate (0.04°/25 mm) at a shear rate of 0 to 100/s;

viscosities >0.25 Pa*s and <10,000 Pa*s were measured using parallel plates (25 mm/25 mm) at a shear rate of 0 to 100/s; and viscosities >10,000 Pa*s were measured using parallel plates (25 mm/25 mm) and at an angular frequency of 100 rad/s.

According to the present invention, a measurement at a "shear rate of 0 to 100/s" is understood as a measurement in which the shear speed is increased, within 100 s, from 0/s to 100/s. The shear speed is then held constant for 30 s, and then the result is determined.

A further essential property of the agents according to the present invention is the so-called tensile shear strength. This is determined by means of the following experimental setup:

Two sandblasted, cold-rolled steel specimens are wetted with the adhesive to be tested, on an overlap area of 2.5 cm² with a layer thickness of 0.2 mm, and bonded. After corresponding curing, the tensile shear strength of the adhesive is tested in accordance with DIN EN 1465 at a rate of 15 mm/min.

It has proven to be advantageous according to the present invention if the adhesives exhibit, after they have cured, a tensile shear strength above 8 MPa, in particular above 10 MPa. The speed of the curing process plays no essential role in this context.

As a third component essential to the invention, the composition according to the present invention contains at least one thiol group-containing hardener for epoxy resins.

According to the present invention, a "thiol group-containing hardener for epoxy resins" is understood as a compound that comprises at least two thiol groups per molecule. It is particularly preferred according to the present invention if the compound is one that is liquid at 22° C.

According to the present invention it may be preferred, in a specific embodiment, if the thiol group-containing hardener is a polymeric compound.

Thiol group-containing hardeners preferred according to the present invention are the compounds known by the commercial designations:

Capcure 3-800, Capcure 3830-81, Capcure LOF, Capcure WR6, Capcure WR35, Capcure 40 SEC HV (Cognis), GPM 800, GPM 800 LO, GPM 830 CB, GPM 845 MT, GPM 888, GPM 890 CB, GPM 891, GPM 895 FC (Gabriel Performance Products), Karenz MT [pentaerythritol tetrakis(3-mercaptobutylate); CAS 31775-89-0] (Showa Denko), dipentenedimercaptan (CAS 4802-20-4), Mercaptized Soy Oil, PM 407, PM 358, Mercaptized Castor Oil: 805-C (Chevron Phillips), Thiocure® GDMA (glycol dimercaptoacetate; CAS 123-81-9), Thiocure® TMPMA (trimethylpropane trimercaptoacetate; CAS 10193-96-1), Thiocure® PETMA (pentaerythritol tetramercaptoacetate; CAS 10193-994), Thiocure® TMPMP (trimethylopropane tris-3-mercaptopropionate; CAS 33007-83-9), Thiocure® PETMP (pentaerythritol tetra-3-mercaptopropionate; CAS 7575-23-7), Thiocure® ETTMP (ethoxylated trimethylpropane tris-3-mercaptopropionate (polymer), CAS 345352-19-4) (Bruno Bock).

The following compounds are also thiol group-containing hardeners preferred according to the present invention:

DMDO (3,6-dioxa-1,8-octanedithiol),
hardenable DMDO reaction product,
3-oxa-1,5-pentanedithiol,
1,2-ethanedithiol T,
1,3-propanedithiol,
1,2-propanedithiol,
1,4-butanedithiol,
1,3-butanedithiol,
2,3-butanedithiol,
1,5-pentanedithiol,
1,3-pentanedithiol,
1,6-hexanedithiol,
1,3-dithio-3-methylbutane,
ethylcyclohexyldithiol (ECHDT),
methylcyclohexyldithiol,
methyl-substituted dimercaptodiethyl sulfide,
dimethyl-substituted dimercaptodiethyl sulfide,
2,3-dimercapto-1-propanol,
bis-(4-mercaptomethylphenyl) ether,
2,2'-thiodiethanethiol.

Thiol group-containing hardeners that are particularly preferred according to the present invention are:

Capcure 3-800, Capcure 3830-81, and Capcure LOF (Cognis),

GPM 800, GPM 800 LO, GPM 830 CB, and GPM 888 (Gabriel Performance Products),

Mercaptized Soy Oil, PM 407, PM 358, and Mercaptized Castor Oil 805-C (Chevron Phillips), Thiocure® ETTMP (ethoxylated trimethyipropane tris-3-mercaptopropionate (polymer); CAS 345352-19-4) (Bruno Bock), 1,5-pentanedithiol,
1,3-pentanedithiol, and
1,6-hexanedithiol.

It may be preferred according to the present invention if the second component of the composition contains less than 25 wt %, in particular less than 20 wt %, in particular less than 10 wt %, of one or more of the following compounds, the quantity indications being based on the entire composition of the second component:

pentaerythritol tetrakis(3-mercaptobutylate) (CAS 31775-89-0),
dipentenedimercaptan (CAS 4802-20-4),
glycol dimercaptoacetate (CAS 123-81-9),
trimethylopropane tris-3-mercaptopropionate (CAS 33007-83-9),
pentaerythritol tetra-3-mercaptopropionate (CAS 7575-23-7),
DMDO (3,6-dioxa-1,8-octanedithiol),
1,2-ethanedithiol,
1,3-propanedithiol,
1,4-butanedithiol,
1,3-butanedithiol,
2,3-butanedithiol, and
2,3-dimercapto-1-propanol.

The thiol group-containing hardeners are used by preference at a ratio of 1 thiol equivalent hardener per 1 to 2 epoxy equivalent. This means that the utilization mixture preferably comprises an excess of reactive epoxy groups with respect to the reactive thiol groups.

In a preferred embodiment of the present invention, the first component further contains at least 10 wt % of an epoxy group-containing reaction product of epichlorohydrin with bisphenol A which has an epoxy equivalent weight of at least 500 g/eq.

In this embodiment, compositions that contain, based on the mass of all epoxy resins, the following components:
a) 10 to 60 wt % of an epoxy group-containing reaction product of epichlorohydrin with polypropylene glycol which has an epoxy equivalent weight of at least 250 g/eq,
b) 15 to 85 wt % of an epoxy group-containing reaction product of epichlorohydrin with a novolac resin which has an epoxy equivalent weight of at least 175 g/eq, and
c) 0 to 70 wt % of an epoxy group-containing reaction product of epichlorohydrin with at least one bisphenol which has an epoxy equivalent weight of at least 500 g/eq,
are accordingly particularly preferred.

Compositions that contain, based on the mass of all epoxy resins, the following components:
a) 30 to 45 wt % of an epoxy group-containing reaction product of epichlorohydrin with polypropylene glycol which has an epoxy equivalent weight of at least 250 g/eq,
b) 30 to 45 wt % of an epoxy group-containing reaction product of epichlorohydrin with a novolac resin which has an epoxy equivalent weight of at least 175 g/eq, and
c) 10 to 40 wt % of an epoxy group-containing reaction product of epichlorohydrin with at least one bisphenol which has an epoxy equivalent weight of at least 500 g/eq,
are particularly preferred according to the present invention.

Compositions that contain, based on the mass of all epoxy resins, the following components:
a) 30 to 45 wt % of an epoxy group-containing reaction product of epichlorohydrin with polypropylene glycol which has an epoxy equivalent weight of at least 250 g/eq,
b) 30 to 45 wt % of an epoxy group-containing reaction product of epichlorohydrin with a novolac resin which has an epoxy equivalent weight of at least 175 g/eq and an epoxy functionality of at least 3, and
c) 10 to 40 wt % of an epoxy group-containing reaction product of epichlorohydrin with at least one bisphenol which has an epoxy equivalent weight of at least 500 g/eq,
are furthermore particularly preferred according to the present invention.

It has proven to be particularly advantageous according to the present invention if the composition according to the present invention contains 0 to 70 wt % of an epoxy group-containing reaction product of epichlorohydrin with bisphenol A which has an epoxy equivalent weight of at least 500 g/eq. A quantity range from 10 to 40 wt % is especially preferred. The quantity indications refer in each case to the mixture of all epoxy resins, without the further formulation constituents.

In the context of the work on which this invention is based, it was possible to show that epoxy group-containing reaction products of epichlorohydrin with bisphenol A having an epoxy equivalent weight of at least 560 g/eq exhibit particularly advantageous properties.

Epoxy group-containing reaction products of epichlorohydrin with bisphenol A which have an epoxy equivalent weight of at least 500 g/eq that are particularly preferred according to the present invention are the epoxy resins marketed under the commercial designations:

Epikote® 1002 (EEW 575 to 700 g/eq; epoxy functionality 2; Hexion),
DER® 662E (EEW 590 to 630 g/eq; epoxy functionality 2),
Epon® 1002F (EEW 600 to 700 g/eq; epoxy functionality 2),
DER® 662UH (EEW 675 to 750 g/eq; epoxy functionality 2),
DER® 663U (EEW 730 to 820 g/eq; epoxy functionality 2),
DER® 664U (EEW 875 to 955 g/eq; epoxy functionality 2),
Epon® 1009F (EEW 2300 to 3800 g/eq; epoxy functionality 2; Hexion),
Epon® 1007F (EEW 1700 to 2300 g/eq; epoxy functionality 2; Hexion),
Epon® 1004F (EEW 800 to 950 g/eq; epoxy functionality 2; Hexion),
DER® 692H (EEW 660 to 720 g/eq; epoxy functionality 2; Dow),
DER® 692 (EEW 660 to 720 g/eq; epoxy functionality 2; Dow).

The products marketed under the commercial designations Epikote® 1002, DER® 662E, and Epon® 1002F are very particularly preferred according to the present invention. Epon® 1002F is very particularly preferred according to the present invention.

It is particularly advantageous according to the present invention if corresponding epoxy group-containing reaction products of epichlorohydrin with bisphenol A which have an epoxy equivalent weight below 500 g/eq are contained in the compositions at a proportion of at most 3 wt %, in particular at a proportion of at most 1 wt %, based in each case on the first component made up of a mixture of reactive epoxy resins and optionally further formulation constituents.

Especially in toxicological terms, it has proven to be advantageous if the compositions according to the present invention contain, in addition to the aforesaid epoxy group-containing reaction products a), b), and c) that are essential to the invention, less than 3 wt %, in particular less than 1 wt %, of further epoxy group-containing reaction products, based in each case on the first component made up of the mixture of reactive epoxy resins and optionally further formulation constituents.

In a particularly preferred embodiment of this subject, the mixture of the epoxy resins is made up of
- a) 10 to 60 wt % of an epoxy group-containing reaction product of epichlorohydrin with polypropylene glycol which has an epoxy equivalent weight of at least 250 g/eq,
- b) 15 to 85 wt % of an epoxy group-containing reaction product of epichlorohydrin with a novolac resin which has an epoxy equivalent weight of at least 175 g/eq, and
- c) 0 to 70 wt % of an epoxy group-containing reaction product of epichlorohydrin with at least one bisphenol which has an epoxy equivalent weight of at least 500 g/eq, the quantities of constituents a), b), and c) adding up to 100 wt %.

In a very particularly preferred embodiment of this subject, the mixture of the epoxy resins is made up of
- a) 30 to 45 wt % of an epoxy group-containing reaction product of epichlorohydrin with polypropylene glycol which has an epoxy equivalent weight of at least 250 g/eq,
- b) 30 to 45 wt % of an epoxy group-containing reaction product of epichlorohydrin with a novolac resin which has an epoxy equivalent weight of at least 175 g/eq, and
- c) 10 to 40 wt % of an epoxy group-containing reaction product of epichlorohydrin with at least one bisphenol which has an epoxy equivalent weight of at least 500 g/eq, the quantities of constituents a), b), and c) adding up to 100 wt %.

In a further very particularly preferred embodiment of this subject, the mixture of the epoxy resins is made up of
- a) 30 to 45 wt % of an epoxy group-containing reaction product of epichlorohydrin with polypropylene glycol which has an epoxy equivalent weight of at least 250 g/eq,
- b) 30 to 45 wt % of an epoxy group-containing reaction product of epichlorohydrin with a novolac resin which has an epoxy equivalent weight of at least 175 g/eq and an epoxy functionality of at least 3, and
- c) 10 to 40 wt % of an epoxy group-containing reaction product of epichlorohydrin with at least one bisphenol which has an epoxy equivalent weight of at least 500 g/eq, the quantities of constituents a), b), and c) adding up to 100 wt %.

It has furthermore proven to be advantageous, in an embodiment of the present invention, if the second component of the two-component composition according to the present invention contains, in addition to the thiol group-containing hardener, an amine group-containing hardener for epoxy resins.

These amine group-containing hardeners for epoxy resins can be selected, for example, from the following compounds: cyclic tertiary amines, aromatic amines, and/or mixtures thereof. The hardeners can be incorporated stoichiometrically into the hardening reaction, but they can also be catalytically active.

Adducts of amino compounds with epoxy resins are furthermore suitable as accelerating additives. Suitable amino compounds are tertiary aliphatic, aromatic, or cyclic amines. Suitable epoxy compounds are, for example, polyepoxides based on glycidyl ethers of bisphenol A or F, or of resorcinol. Concrete examples of such adducts are adducts of tertiary amines such as 2-dimethylaminoethanol, N-substituted piperazines, N-substituted homopiperazines, N-substituted aminophenols with di- or polyglycidyl ethers of bisphenol A or F or of resorcinol.

Suitable for this, for example, are the di- or trifunctional aminoterminated polyalkylene glycols known as "Jeffamine™ D" or "Jeffamine™ T," especially based on ethylene oxide and/or propylene oxide. Further examples are polyaminoamides (preferably various grades of Versamid™, Aradur™, or Ancamide™), polyamines (preferably diethylenetriamine, triethylenetetramine, tetraethylenepentaamine, pentaethylenehexamine, Aradur™, Ancamin™, Lauromin™), cycloaliphatic polyamines (preferably Ancamine™, Lauromine™), polyaminoimidazoline (preferably Versamid™), aralkylamines (preferably MXDA), aromatic amines (preferably 4,4'-diaminodiphenyl sulfone, MDA), tertiary amines (preferably Versamine EH-30, Versamine EH-50).

The amino group-containing hardener or hardeners for epoxy resins are contained in the agents according to the present invention by preference in quantities from 0 to 20 wt %, based on the second component made up of hardeners and optionally further formulation constituents.

In a preferred embodiment, the tertiary amines in particular have proven to be particularly advantageous. They are contained in the agents according to the present invention by preference in a quantity from 0 to 20 wt %, in particular from 5 to 15 wt %, based in each case on the second component made up of hardeners and optionally further formulation constituents.

Compositions whose second component contains or represents a hardener for epoxy resins that is effective in a temperature range from 0 to 60° C., in particular from 0 to 25° C., are particularly preferred according to the present invention.

In order to improve fracture behavior, in particular at temperatures below 0° C., the preparations according to the present invention can contain one or more different so-called toughness improvers or "tougheners." Such tougheners are known to those skilled in the art of epoxy adhesives. They can be selected, for example, from: thermoplastic isocyanates or polyurethanes, rubber particles, in particular those having a core-shell structure, and block copolymers, in particular those that contain a first polymer block having a glass transition temperature of less than 15° C. and a second polymer block having a glass transition temperature of more than 25° C. Such block copolymers are by preference selected from those in which a first polymer block is selected from a polybutadiene or polyisoprene block, and a second polymer block is selected from a polystyrene or polymethyl methacrylate block. Specific examples thereof are block copolymers having the following block structure: styrene-butadiene-(meth)acrylate, styrene-butadiene-(meth)acrylic acid esters, ethylene-(meth)acrylic acid ester-glycidyl(meth)acrylic acid ester, ethylene-(meth)acrylic acid ester-maleic acid anhydride, methyl methacrylate-butyl acrylate-methyl methacrylate.

It has furthermore proven advantageous according to the present invention if the first component of the compositions according to the present invention contains, in addition to the mixture of epoxy resins, at least one inorganic and/or organic filler.

In a further embodiment, it has proven advantageous if the second component of the composition according to the present invention contains, in addition to the hardeners that are essential to the invention, at least one inorganic and/or inorganic filler.

Fillers preferred according to the present invention are, for example, the various ground or precipitated chalks, carbon black, calcium-magnesium carbonates, talc, barite, and in particular silicate fillers of the aluminum-magnesium-calcium silicate type, for example wollastonite, chlorite.

For weight reduction, the preparation can also contain, in addition to the aforesaid "normal" fillers, so-called lightweight fillers. These can be selected from the group of the hollow metal spheres such as, for example, hollow steel spheres, hollow glass spheres, fly ash (fillite), hollow plastic spheres based on phenol resins, epoxy resins, or polyesters, expanded hollow microspheres having a wall material made of (meth)acrylic acid ester copolymers, polystyrene, styrene/(meth)acrylate copolymers, and in particular of polyvinylidene chloride as well as copolymers of vinylidene chloride with acrylonitrile and/or (meth)acrylic acid esters, ceramic hollow spheres, or organic lightweight fillers of natural origin such as ground nut shells, for example the shells of cashew nuts, coconuts, or peanuts, as well as cork flour or coke powder. Particularly preferred in this context are those lightweight fillers, based on hollow microspheres, that ensure high compressive strength in the cured preparation.

In addition, the curable preparations according to the present invention can contain further usual adjuvants and additives such as, for example, plasticizers, rheology adjuvants, wetting agents, adhesion promoters, aging protection agents, stabilizers, and/or color pigments.

The two-component adhesives according to the present invention can be used as adhesives, or as a matrix for a composite, a further embodiment of the present invention being constituted thereby. The adhesive can be utilized in particular for joining and repairing parts in shipbuilding, aircraft construction, and vehicle construction. It is notable for good processability and high strength on the one hand, and particularly low health risk on the other. Further areas of application for the systems according to the present invention are the do-it-yourself sector, as well as the maintenance, repair, and overhaul sector for vehicles, machines, and aviation, but areas of application in other sectors of general industry are also encompassed according to the present invention.

The agents according to the present invention are made up of two components. These must be stored separately from one another until immediately before utilization.

This can preferably be done by packaging in separate containers. Removal of the preparation can then be accomplished immediately before utilization. This can be accomplished by manually measuring out the requisite quantities from storage vessels, for example drums.

In addition to purely manual measuring, dispensing can also be accomplished using simple manual dispensing units or even fully automated systems. Such systems are marketed, for example, by the Loctite company. Examples of such automated systems are volumetric double gear pumps, double precision piston dispensers, double screw pump dispensers, or drum pump systems.

In a particularly preferred embodiment of the present invention, the preparations according to the present invention are offered in corresponding cartridges having a volume ratio of 1:1, 1:2, or 1:10 (component having epoxy resin mixture: component having thiol group-containing hardeners). The selection of such double cartridges is intended, according to the present invention, to ensure consistent dispensing and thus a constant mixing ratio between the two components. The cartridges according to the present invention can be emptied, upon utilization, with the aid of simple manual dispensing units, but also using pneumatic and/or completely automated systems.

A second subject of the present invention is therefore a dispensing system that comprises two separate containers which, separately from one another, contain the first and the second component of the compositions according to the present invention, as well as a dispensing apparatus.

In another packaging form, the two components of the composition according to the present invention can be coextruded and accordingly packaged so as to be present directly next to one another until utilization. The two components must then be thoroughly mixed with one another at the time of utilization. This can be accomplished, for example, by kneading the coextrudates.

A third subject of the present invention is therefore a composition according to one of claims 1 to 9 that is presented as a coextrudate.

A fourth subject of the present invention is a method for joining and/or repairing parts, in which method, in a first step, the two components of the compositions according to the present invention are mixed with one another, the resulting utilization mixture is applied onto the overlapping surfaces of the parts to be joined, the parts are then brought into contact with one another, and the utilization mixture then cures.

The curing time depends, in this context, on the exact composition of the system, the quantity applied, and the layer thickness, and can be between a few minutes and several days.

EXEMPLIFYING EMBODIMENTS

1 Resin Mixtures
1.1 Producing the Resin Mixtures

The following resin mixtures were produced by mixing the individual components and stirring vigorously at 70 to 100° C. for 1 hour.

1.2 Measuring Viscosities

Viscosities were measured on an ARES unit of the TA Instruments company, New Castle, Del. 19720, USA, at a temperature of 25° C., and evaluated using TA Orchestrator software. At a viscosity <0.25 Pa*s, measurement was performed using a cone and plate (0.04°/25 mm) at a shear rate of 0 to 100/s. Viscosities >0.25 Pa*s and <10,000 Pa*s were measured using parallel plates (25 mm/25 mm) at a shear rate of 0 to 100/s. Viscosities >10,000 Pa*s were measured using parallel plates (25 mm/25 mm) and at an angular frequency of 100 rad/s.

| | Compositions and results | | | | |
|---|---|---|---|---|---|
| | DER 732 [g] | DEN 439 [g] | Epikote 1002 [g] | Viscosity [Pa * s] | EEW* [g/eq] |
| H1 | 40 | 40 | 20 | 80 | 281 |
| H2 | 40 | 30 | 30 | 106 | 311 |
| H3 | 40 | 20 | 40 | 180 | 348 |
| H4 | 40 | 10 | 50 | 320 | 395 |
| H5 | 30 | 40 | 30 | 680 | 294 |
| N1 | 20 | 0 | 80 | 20,000 | 532 |
| N2 | 15 | 0 | 85 | 75,000 | 555 |
| N3 | 85 | 0 | 15 | 0.375 | 345 |

The EEW* value indicated in the last column was calculated from the weighted EEW values of the individual components. As compared with resin mixtures H1 to H5 according to the present invention, resin mixtures N1 and N2 not according to the present invention exhibit viscosities that are much too high. Optimum utilization is not possible at such viscosities.

2 Determining Tensile Shear Strengths

To determine the tensile shear strengths, components I and II as indicated in Table 2 were thoroughly mixed with one another. Immediately thereafter, two sandblasted, cold-rolled steel specimens with an overlap area of 2.5 cm$^2$ were wetted with the resulting adhesive at a layer thickness of 0.2 mm, and bonded. The specimens were then cured for 7 days at room temperature.

After that time, the tensile shear strength of the adhesive was tested in accordance with DIN EN 1465 at a speed of 15 mm/min.

TABLE 2

| Component I | | Component II | | Eq CI/ | LSS |
|---|---|---|---|---|---|
| Resin | Fillers | Hardener | Catalyst | Eq CII | [N/mm²] |
| 4.48 g H1 (0.0159 Eq) | 2.09 g Luzenac 2; 0.30 g Cabosil TS-720 | 3.13 g Capcure 3830-81 (0.0100 Eq) | — | 1.6 | 15 |
| 4.94 g H1 (0.0176 Eq) | 1.56 g Omyacarb 4HD; 0.13 g Cabosil TS-720 | 3.0 g Capcure 3-800 (0.0108 Eq) | 0.37 g Versamine EH-30 | 1.6 | 12 |
| 10.0 g H5 (0.0340 Eq) | — | 5.9 g Capcure 3-800 (0.0212 Eq) | 0.74 g Versamine EH-30 | 1.6 | 12 |
| 5.96 g H1 (0.0212 Eq) | — | 3.67 g Capcure 3-800 (0.0132 Eq) | 0.37 g Versamine EH-30 | 1.6 | 16 |
| 10.0 g H3 (0.0287 Eq) | — | 5.0 g Capcure 3-800 (0.0180 Eq) | 0.64 g Versamine EH-30 | 1.6 | 15 |
| 10.0 g H2 (0.0322 Eq) | — | 5.6 g Capcure 3-800 (0.0201 Eq) | 0.70 g Versamine EH-30 | 1.6 | 12 |
| 10.0 g H4 (0.0253 Eq) | — | 4.4 g Capcure 3-800 (0.0158 Eq) | 0.55 g Versamine EH-30 | 1.6 | 16 |
| 7.42 g N2 (0.0138 Eq) | — | 2.34 g Capcure 3-800 (0.0084 Eq) | 0.23 g Versamine EH-30 | 1.6 | <0.1 |
| 6.45 g N3 (0.0187 Eq) | — | 3.23 g Capcure 3-800 (0.0116 Eq) | 0.32 g Versamine EH-30 | 1.6 | 2 |
| 7.42 g N1 (0.0139 Eq) | — | 2.41 g Capcure 3-800 (0.0087 Eq) | 0.24 g Versamine EH-30 | 1.6 | <0.1 |
| 4.90 g DER 331 (0.0262 Eq) | — | 4.54 g Capcure 3-800 (0.0163 Eq) | 0.56 g Versamine EH-30 | 1.6 | 11 |

In determining the quantities of raw materials caused to react with one another, care was taken to maintain a constant ratio between reactive epoxy components and reactive thiol groups in the utilization mixture. The respective equivalents used, and their ratios, are likewise evident from Table 2.

The measured tensile shear strengths (LLS) clearly show that the two-component compositions according to the present invention having resins H1 to H3 are clearly superior to the two-component compositions not according to the present invention having resins N1 to N3. It was additionally possible to show by way of these measurements that the tensile shear strengths of the systems according to the present invention in fact turn out to be higher than the tensile shear strength of a conventional adhesive based on DER 331, which has a high sensitizing potential and is subject to labeling requirements.

In a further embodiment of the Examples, the fillers Luzenac 2, Cabosil TS-720, and Omyacarb 4HD associated with component I in the context of the Examples were also incorporated into components II.

3 List of Raw Materials Used

| | |
|---|---|
| Cabosil ® TS-720 | Silicon dioxide, pyrogenic amorphous silicic acid; manufacturer: Cabot |
| Capcure ® 3-800 | Mercaptan-terminated liquid polymer; mercaptan number at least 3.0 meq/g; mercaptans equivalent weight 278 g/eq.; manufacturer: Cognis |
| Capcure ® 3830-81 | Mixture of 8 parts by weight Capcure ® 3-800 and 1 part by weight Versamine ® EH-30; manufacturer: Cognis |
| DEN ® 439 | Reaction product of epichlorohydrin with a phenol/formaldehyde novolac; EEW 200 g/eq; epoxy functionality ±3.8; manufacturer: Dow |
| DER ® 331 | Reaction product of bisphenol A with epichlorohydrin; EEW 187 g/eq; manufacturer: Dow |
| DER ® 732 | Reaction product of epichlorohydrin with polypropylene glycol; EEW 320 g/eq; manufacturer: Dow |
| Epikote ® 1002 | Reaction product of epichlorohydrin with bisphenol A; EEW 638 g/eq; manufacturer: Hexion; |
| Luzenac ® 2 | Natural association of talc, chlorite, and dolomite; manufacturer: Luzenac Group |
| Omyacarb ® 4HD | Calcium carbonate (limestone flour; manufacturer: Omya GmbH 2,4,6-Tris(dimethyl-aminomethyl)phenol; 100% active substance content; manufacturer: Cognis. |
| Versamine ® EH-30 | |

The invention claimed is:

1. A two-component composition comprising a first component and a second component,
   wherein the first component is a mixture of reactive epoxy resins comprising, based on the mass of all epoxy resins,
   a) 30 to 45 wt % of an epoxy group-containing reaction product of epichlorohydrin with polypropylene glycol which has an epoxy equivalent weight of at least 250 g/eq;
   b) 30 to 45 wt % of an epoxy group-containing reaction product of epichlorohydrin with a novolac resin which has an epoxy equivalent weight of at least 175 g/eq;
   c) 10 to 40 wt % of an epoxy group-containing reaction product of epichlorohydrin with bisphenol A, which has an epoxy equivalent weight of at least 500 g/eq; and
   d) optionally, formulation constituents; and wherein the second component contains at least one thiol group-containing hardener for epoxy resins; and wherein the two-component, upon cure, has a tensile shear strength of greater than 8 MPa, measured in accordance with DIN EN 1465.

2. The composition according to claim 1, wherein the second component additionally contains an amine group-containing hardener for epoxy resins.

3. The composition according to claim 1, wherein component a) has an epoxy equivalent weight of at least 300 g/eq, and/or component b) has an epoxy equivalent weight of at least 190 g/eq.

4. The composition according to claim 1, wherein component b) contains or represents a novolac resin having an epoxy functionality of at least 3.

5. The composition according to claim 1, wherein component b) contains or represents a phenol-formaldehyde novolac resin and/or a cresol-formaldehyde novolac resin.

6. The composition according to claim 1, wherein its second component contains or represents a hardener for epoxy resins that is effective in a temperature range from 0 to 60° C.

7. The composition according to claim 6, wherein the hardener for epoxy resins has an effective temperature range from 0 to 25° C.

8. The composition according to claim 1, wherein the first component contains, in addition to the mixture of epoxy resins, at least one inorganic and/or organic filler.

9. A dispensing system that comprises two separate containers which, separately from one another, contain the first and the second component of the compositions according to claim 1, as well as a dispensing apparatus.

10. The composition according to claim 1, wherein the tensile shear strength is greater than 10 MPa.

* * * * *

UNITED STATES PATENT AND TRADEMARK OFFICE
CERTIFICATE OF CORRECTION

| | | |
|---|---|---|
| PATENT NO. | : 8,642,709 B2 | Page 1 of 1 |
| APPLICATION NO. | : 13/624108 | |
| DATED | : February 4, 2014 | |
| INVENTOR(S) | : Pablo Walter et al. | |

It is certified that error appears in the above-identified patent and that said Letters Patent is hereby corrected as shown below:

In the specification

Column 3, line 28: Change "500 PaS" to -- 500 Pas --.

Column 4, line 59: Change "trimethyipropane" to -- trimethylpropane --.

Column 12, Table 2 (line 45): After "flour;", insert -- manufacturer: Omya GmbH --.

Column 12, Table 2 (line 46): After "Versamine® EH-30", delete "manufacturer: Omya GmbH".

Signed and Sealed this
Twenty-fourth Day of May, 2016

Michelle K. Lee
*Director of the United States Patent and Trademark Office*